(12) United States Patent
Caine et al.

(10) Patent No.: US 10,430,118 B2
(45) Date of Patent: Oct. 1, 2019

(54) TRANSPARENT DEVICE DRIVER INTEGRATION

(71) Applicant: NCR Corporation, Duluth, GA (US)

(72) Inventors: Nicholas Caine, Gainesville, GA (US); Andrew J. Wurfel, Smyrna, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/796,015

(22) Filed: Oct. 27, 2017

(65) Prior Publication Data

US 2019/0129652 A1    May 2, 2019

(51) Int. Cl.
*G06F 13/12* (2006.01)
*G06F 3/06* (2006.01)
*G06F 3/0354* (2013.01)
*G06F 1/16* (2006.01)

(52) U.S. Cl.
CPC .......... *G06F 3/0659* (2013.01); *G06F 1/1692* (2013.01); *G06F 3/03541* (2013.01); *G06F 13/126* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,980,944 B1 * | 12/2005 | Oshins | ................ | G06F 17/5022 703/17 |
| 7,082,598 B1 * | 7/2006 | Le | .......................... | G06F 9/4411 703/21 |
| 9,436,644 B1 * | 9/2016 | Haymond | ............... | G06F 13/10 |
| 2002/0133487 A1 * | 9/2002 | Oshins | .................. | G06F 9/4411 |
| 2005/0198596 A1 * | 9/2005 | Oshins | .................. | G06F 9/4411 710/315 |
| 2005/0245719 A1 * | 11/2005 | Mather | .............. | C08G 18/3893 528/60 |
| 2010/0180050 A1 * | 7/2010 | Hsiao | ..................... | G06F 13/102 710/5 |
| 2010/0206867 A1 * | 8/2010 | Acero Acero | ......... | H05B 6/065 219/468.1 |

* cited by examiner

*Primary Examiner* — Raymond N Phan
(74) *Attorney, Agent, or Firm* — Schwegman, Lundberg & Woessner

(57) ABSTRACT

A virtualized peripheral driver and filter are installed at a kernel level of an Operating System (OS) on a host device. A new peripheral driver is installed on the host device and added to the peripheral device stack within the OS. Events generated from the user level of the OS are pushed through the stack for processing by a newly attached peripheral of the host device using the new peripheral driver. Events produced from the kernel for the peripheral are trapped by the filter when passing up through the stack to the user level of the OS and provided to the virtualized peripheral driver. The virtualized peripheral driver repackages, translates, and formats the events produced from the kernel as OS events expected by the OS for processing and the repacked, translated, and formatted events are processed by the OS.

20 Claims, 5 Drawing Sheets

TRANSPARENT DEVICE DRIVER INTEGRATION

BACKGROUND

A peripheral is typically interfaced to a host device through a Universal Serial Bus (USB) port. A driver is needed by the Operating System (OS) to successfully interact with firmware of the peripheral on the host device. That is, the OS needs to understand how to communicate with the firmware of the peripheral and how to process information received from the peripheral; the driver for the peripheral provides this necessary OS interface.

Changes and updates to peripheral drivers frequently occur as do changes and updates to the OS. Two different attached peripherals may produce driver information from their drivers that is of a same type of information recognized and processed by the OS. Also, when a new peripheral driver is added to a host device for a new peripheral, the underlying information processed by the OS may conflict with peripheral information for an existing installed peripheral driver of an existing interfaced peripheral.

These conflicts between drivers can cause a variety of problems. For example, an existing driver may need to be removed from the OS for a new driver to be successfully installed. The existing driver may or may not be capable of being reinstalled once the new driver is successfully installed on the host device. The new driver may cause native functions available in an existing installed driver to stop working. Additionally, when support is needed for these driver conflicts, the first thing technical support will request is that the user first remove the existing driver from the OS before trying to install the new driver.

In some cases, a user may receive no notice of any conflicts between a newly installed driver and an existing driver until a certain function is attempted by the user, which may then case a fatal fault in the host device or may return information to the user that is totally unexpected causing significant user confusion.

SUMMARY

In various embodiments, methods and a device for peripheral device driver integration are presented.

According to an embodiment, a method for peripheral device driver integration is presented. Specifically, in one embodiment, an event is intercepted that is being pushed up a peripheral stack within a kernel of an OS. The event is translated to a format that the OS is configured to process and the event passed in the format to a kernel process within the OS for continued processing by the OS.

DETAILED DESCRIPTION

Figure 1A:
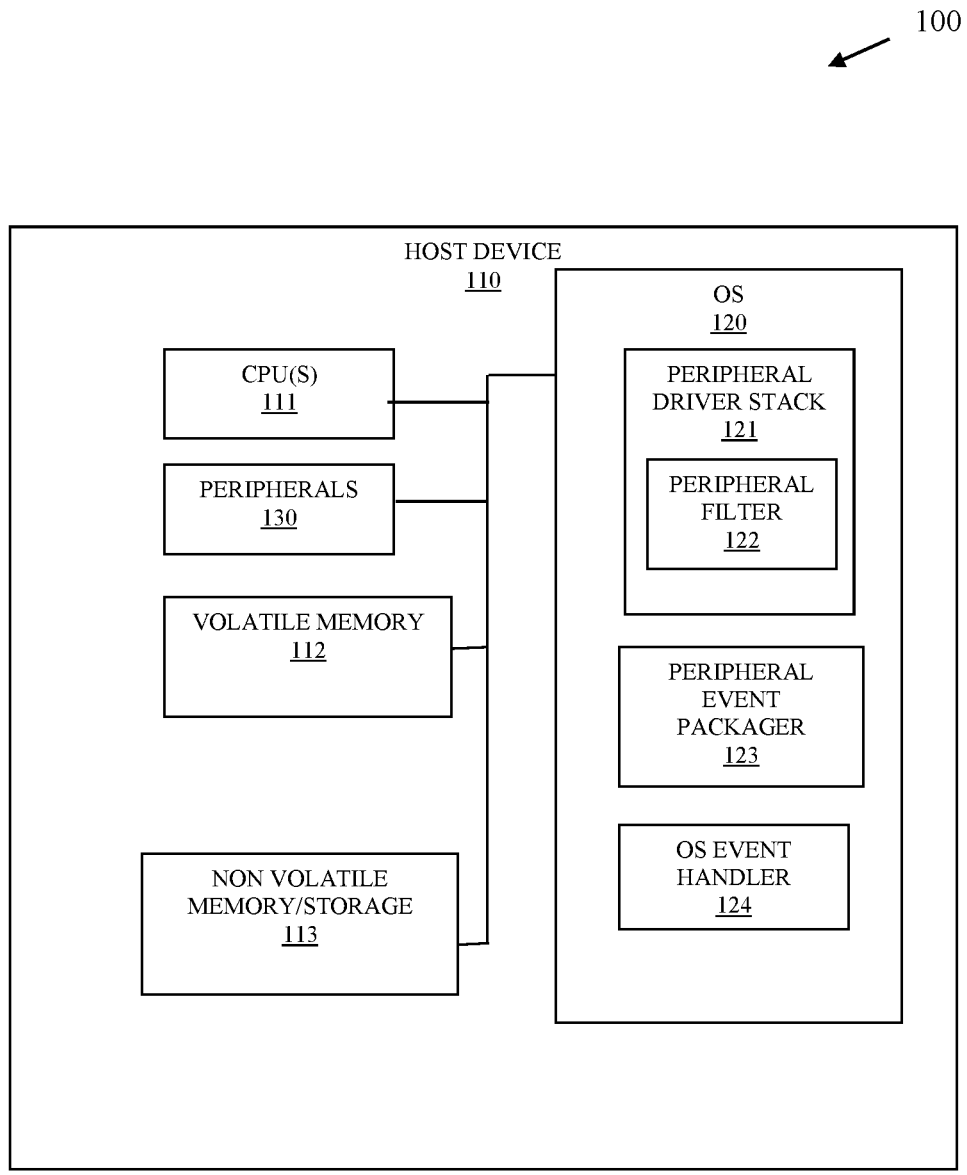
FIG. 1A is a diagram of a system for transparent device driver integration, according to an example embodiment.

FIG. 1A is a diagram of a system 100 for transparent device driver integration, according to an example embodiment. It is to be noted that the components are shown schematically in greatly simplified form, with only those components relevant to understanding of the embodiments being illustrated.

Furthermore, the various components (that are identified in the FIGS. 1A-1B) are illustrated and the arrangement of the components is presented for purposes of illustration only. It is to be noted that other arrangements with more or less components are possible without departing from the teachings of transparent device driver integration, presented herein and below.

The system 100 includes a host device 110. The host device 110 includes one or more Central Processing Units (CPUs—hardware processors) 111 and volatile memory 112, non-volatile memory/storage 113.

When the host device 110 is booted, the OS 120 is loaded from Read-Only Memory (ROM) into the volatile memory 112 for execution by the processor(s) 111. The OS 120 includes a peripheral (device) driver stack 121, loaded at the top of the stack 121 is a peripheral filter 122. The peripheral filter 122 pushes events received in the stack 121 to a peripheral event manager 123. The peripheral event manager 123 packages the events received and passes them back to the OS event handler 124.

Conventionally, when a new peripheral driver is installed on a host device, the new driver is pushed to the OS peripheral driver stack. The issue is that the new driver may generate underlying OS events in response to an action taken on the driver from the user-level of the OS. These new events may generate other events within the OS from the stack that are then pushed back up through the OS (at the kernel level) for handling but the OS may not recognize the formats of the other events as a result compatibility issues arise. It may also be the case that there is no action pushed at all through the user-level of the OS for the new driver to generate events, which means the OS may issue warnings or encounter error conditions through no direction of the user of the host device. The OS itself may require periodic events to be generated at a predefined rate to ensure that the new peripheral is operating and still present. Conventionally, if the new driver does not produce these events or does not produce the events at a predefined rate, the OS may issue warnings or encounter errors with respect to operating the new peripheral.

Peripherals are also often categorized by the OS for underlying OS generic support and functionality. For example, consider Human Interface Devices (HIDs), such as keyboard, mice, touchscreens, keypads, and the like. Typically, the OS will map coordinates of interaction on a presented screen into mouse coordinates. This allows the OS to perform operations for the HID in a more efficient and generic manner down through the network stack to the HID and back from the HID to the user level of the OS.

The context associated with HID peripherals is discussed below in the FIG. 1B with respect to the peripheral filter 122 and the peripheral event packager 123 for providing the transparent device driver integration provided herein.

Figure 1B:
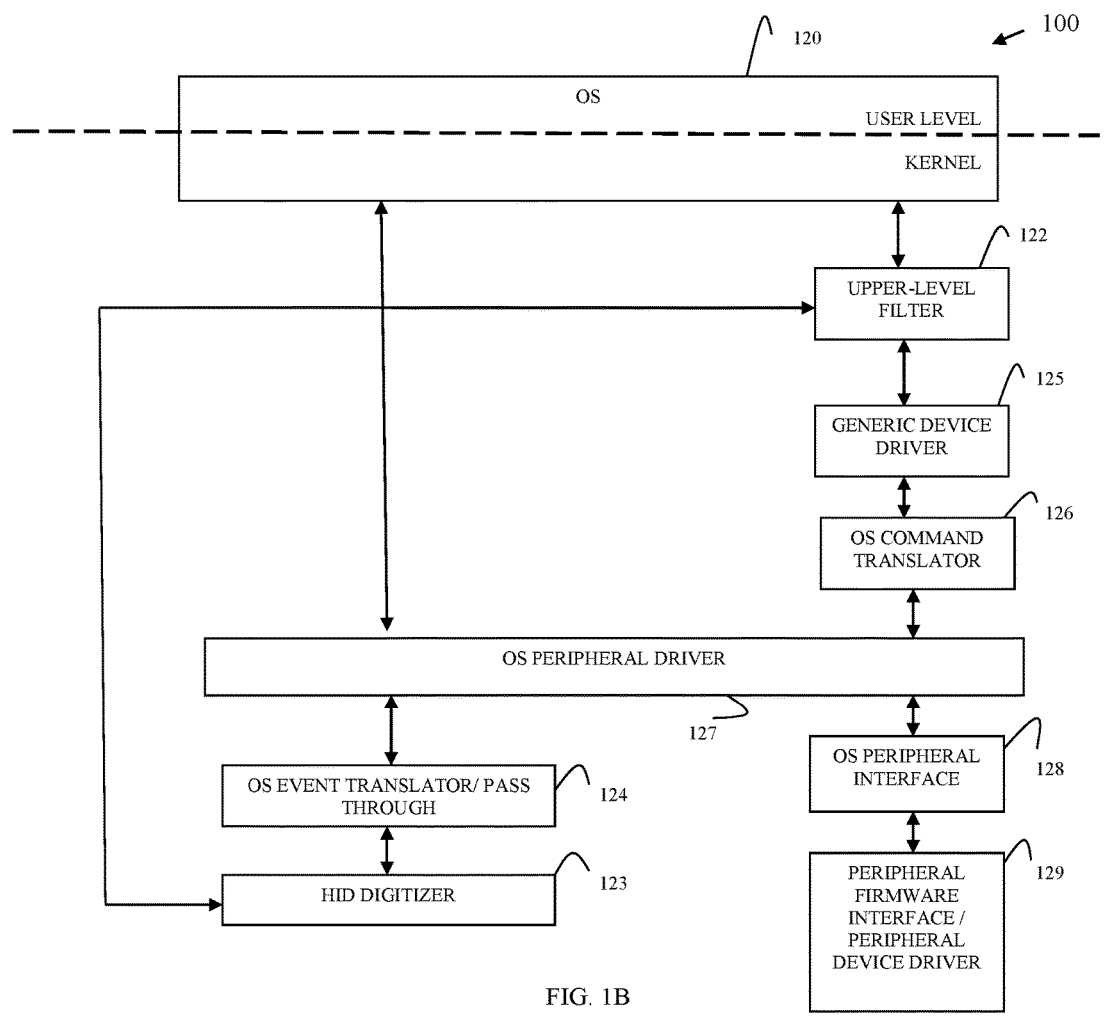
FIG. 1B is a diagram of interaction of the system for transparent device driver integration, according to an example embodiment.

FIG. 1B is a diagram of interaction of the system 100 for transparent device driver integration, according to an example embodiment.

Initially, the peripheral filter 122 and the peripheral event packager 123 are installed as a generic peripheral device driver within the peripheral driver stack 121. In an embodiment, the peripheral event packager 123 as a virtual HID digitizer (herein after "HID digitizer 123"). The peripheral filter 122 (herein after "upper filter 122") is installed with the HID digitizer 123 as an upper-level filter within the stack 121. Upper-level filters trap events produced or raised by HID peripherals and their already installed device drivers within the kernel level of the OS 120 before such events are pushed up to the user level of the OS 120. Conversely, a lower-level filter would trap events being pushed down from the user level of the OS 120 to the HID peripherals and peripheral drivers within the kernel of the OS 120.

A global install file (such as an INF file in Windows®) for loading any HID driver to the host device includes a reference to the upper-level filter 122. The upper-level filter 122 when referenced generates an instance of the HID digitizer 123. In an embodiment, the upper-level filter 122 is registered, installed, and accessed on all OS mouse events (generic processing recognized and processed by the OS 120 for all HID drivers installed on the host device 110).

The initial installation of the HID digitizer 123 and the upper-level filter 122 through the install file. The system 100 permits any HID device driver 129 to be installed and process normally for all events being generated from the user level and pushed down to the firmware of the HID peripheral. However, any HID device driver 129 generated mouse event are trapped as they are being pushed up through the kernel to the user-level by the upper-level filter 122 and passed to an instance of the HID digitizer 123 for initial handling. The HID digitizer 123 packages, translates, and formats mouse events from any newly installed HID driver into mouse events that are recognized and processed by the OS 120 in a normal and expected manner by the OS 120. The HID digitizer 123 may rescale coordinate values for the mouse events in situations where the newly installed HID driver produces coordinate values that fall out of a range recognized by the OS 120. The HID digitizer 123 may also generate mouse events with information expected by the OS 120 for the newly installed HID peripheral at rates that are required by the OS 120.

In an embodiment, a separate customized instance of the HID digitizer 123 is generated with each new HID driver installed on the device based on predefined configured information that is accessible through a file. The predefined configured information may define the coordinate values, digit sizes (for X and Y coordinates), auto-generated HID peripheral information, etc. for the new HID driver and map that to a configuration for an instance of the HID digitizer 123. This ensures that the HID digitizer 123 is installed once but generated as needed with each newly installed HID driver as an independent instance within the OS 120 for each new HID driver installed within the OS 120. Each instance customized to properly package, translate, and format a particular new HID driver's generated event values into expected mouse values that the OS 120 can process when such event values are pushed to the user level from the kernel level from the HID driver.

During operation, any events, commands, actions pushed from the user level of the OS 120 down to the kernel of the OS for processing by a new peripheral driver 129 is processed as would be the case with any newly installed peripheral driver. The upper-level filter 122 is not triggered for events being pushed from the user level to the kernel. This means the events pass through unchanged by the upper-level filter 122 to the generic device driver 125 for the new peripheral. An OS command translator 126 translates the peripheral commands into an OS-support HID type formats and passes to a generic OS peripheral driver 127 for the type of peripheral installed. This is passed to the OS peripheral interface 128, which directly interacts with the newly installed peripheral through that peripheral's firmware interface (newly installed device driver) 129. All functionality provided by the peripheral driver 129 is available to the user of the host device 110.

Any events that are generated from the peripheral firmware interface/driver 129 (as a result of the user-initiated commands or based on a configuration of the peripheral to generate specific types of events at predefined intervals of time) are pushed up through the stack 121 and trapped by the upper-level filter 122 and sent to the HID digitizer 123. The HID digitizer 123 packages, translates, and formats those peripheral generated events into generic mouse events handled by the OS 120 and the newly packaged, translated, and formatted events are passed to the OS event translator/ pass through 124 where the OS 120 handles in the manner that the OS 120 is configured to handle.

In an embodiment: the OS 120 is Windows®, the generic peripheral driver 125 is the MouClass.sys file that Windows® maintains as a generic driver for all mice HIDs (so for any HID device because Windows® recognizes and processes HID input values as mice values), the OS command translator 126 is the MouHid.sys file that Windows® processes to translate the mouse commands for use with a generic keyboard commands, the OS peripheral driver 127 is the HIDCLASS.sys file that is part of the Windows® kernel for HID interaction, the OS peripheral interface 128 is the HIDUSB.sys Windows® file that provides low-level interface with USB attached peripherals, the peripheral firmware interface 129 is the USBCCGP.sys/USBHUB.sys Windows® file and includes the new device driver for the peripheral. That is, the peripheral firmware interface 129 is the new device driver being installed or accessed from the host device 110, and the OS event translator/pass through 124 is the MsHidKmdf.sys file (Windows® middleware ("middle man") between the HID class driver and the HID mini driver.

In an embodiment, the upper-level filter 122 is a Mou-Filt.sys file that Windows® allows to pre-process mouse data forwarded to the and from the kernel. This upper-level filter 122 is configured to intercept all mouse data and format that mouse data into packets that the HID digitizer 123 is configured to process as a virtual device within the OS 120 as a Physical Device Object (PDO). The upper-level filter 122 is responsible for all HID digitizer 123 data creation and touch timing (time and rate). The upper-level filter 122 is responsible for handling read requests and responds to these requests within a minimum of 10 ms (microseconds). The upper-level filter 122 creates the PDO so that the HID digitizer 123 can be attached to within the OS 120 at run time to handle the data produced by the upper-level filter 122. This provides a shared driver to the virtualized HID digitizer 123 that does not require shared memory within the OS 120 or driver-to-driver communications to be set up. The PDO instance is created with a PDO device identifier upon receipt of the USB peripheral identifier for the newly attached peripheral. For example, for a peripheral with a virtual ID of 0X07D5 and Physical Device Identifier (PID) of 0x1234 has a POD created device id of Moutfilt/ VID_07D5@PID_1234. The HID digitizer 123 is a Functional Device Object (FDO) that attaches itself to the PDO created by the upper-level filter 122. The HID digitizer 123 is configured with programming logic for properly presenting the HID digitizer 123 to the OS 120. The digitizer 123 is packages, translates, and formats the HID digitizer data provided by the upper-level filter 122 to the OS through the pass through 124. HID read requests are forward to the PDO after the upper-level filter produces the digitizer data. The PDO is registered and attached to the FDO, which is the digitizer 123.

The upper-level filter 122 and the virtualized HID digitizer 123 combine to allow new HID peripherals to be loaded within the peripheral driver stack 122 of the OS 120 such that newly added drivers can operate with existing installed HID drivers without conflict. Existing functionality of the existing installed HID drivers are maintained and the new functionality for a new HID driver is available. The HID digitizer 123 with the upper-level filter 122 and instances of the HID digitizer 123 are attached to an initiated upon installation of a new HID driver. The diagnostic testing can be performed on newly installed HID drivers and HID peripherals without being forced to de-install and remove existing HID peripheral drivers.

Furthermore because the HID digitizer 123 packages the kernel events into a HID supported event and provides to the pass through 124. In some circumstances, existing OS features that may not be available with a newly installed device driver may be exposed and available within the OS 120 with any newly attached peripheral.

These and other embodiments will now be discussed with reference to the FIGS. 2-4.

Figure 2:
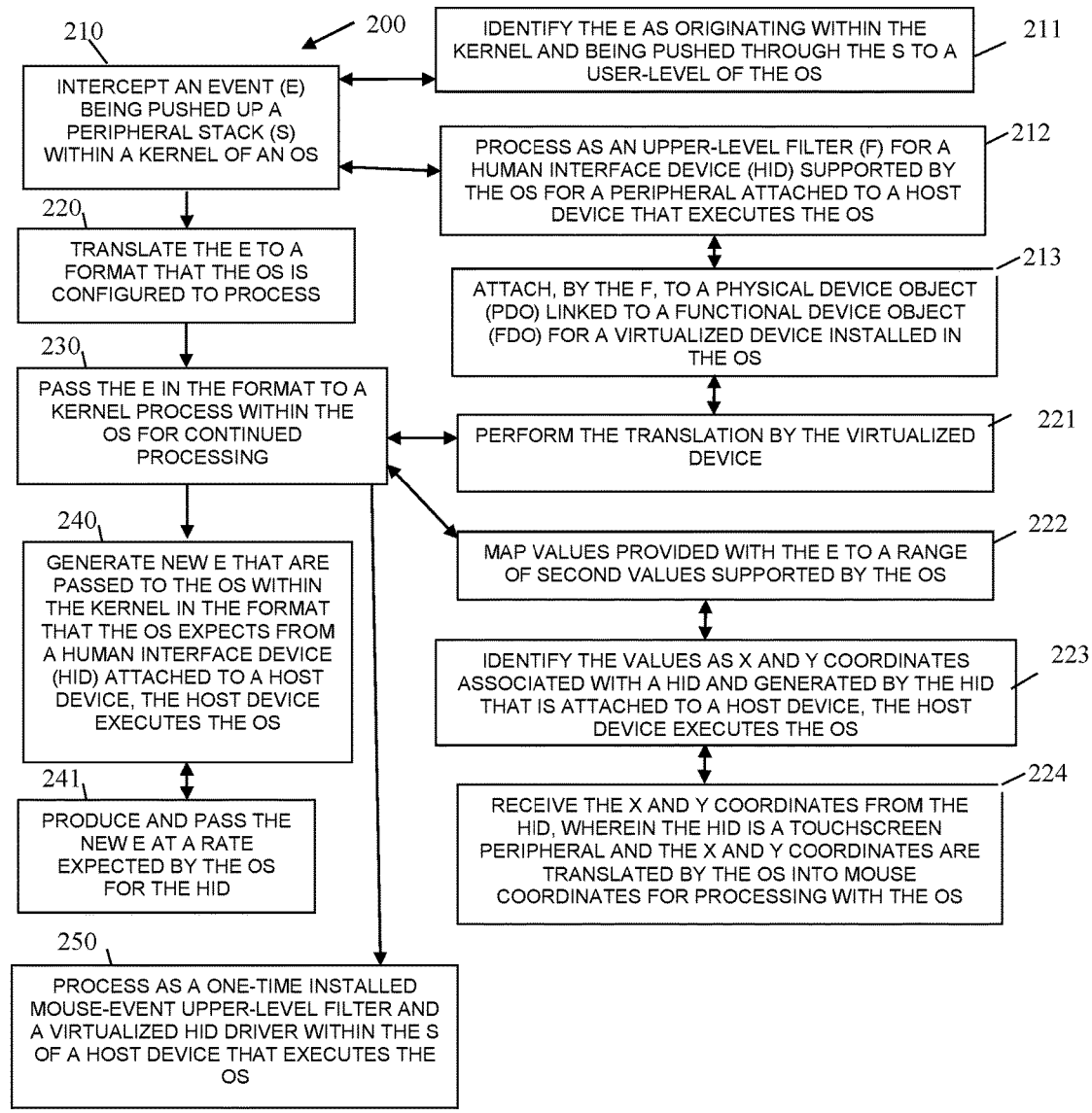
FIG. 2 is a diagram of a method for transparent device driver integration, according to an example embodiment.

FIG. 2 is a diagram of a method 200 for transparent device driver integration, according to an example embodiment. The software module(s) that implements the method 200 is referred to as an "OS kernel-level driver integrator." The OS kernel-level driver integrator is implemented as executable instructions programmed and residing within memory and/or a non-transitory computer-readable (processor-readable) storage medium and executed by one or more processors of a device. The processor(s) of the device that executes the OS kernel-level driver integrator are specifically configured and programmed to process the OS kernel-level driver integrator. The OS kernel-level driver integrator may have access to one or more network connections during its processing. The network connections can be wired, wireless, or a combination of wired and wireless. In an embodiment, the OS kernel-level driver integrator does not require or does not have any network connectivity during its processing.

In an embodiment, the device that executes the OS kernel-level driver integrator is the host device 110.

In an embodiment, the device that executes the OS kernel-level driver integrator is a Point-Of-Sale (POS) device that is operated by a clerk to perform customer transactions during a checkout of the customer at a retail establishment.

In an embodiment, the device that executes the OS kernel-level driver integrator is a Self-Service Terminal (SST). In an embodiment, the SST is a kiosk. In an embodiment, the SST is an Automated Teller Machine (ATM).

In an embodiment, the device that executes the OS kernel-level driver integrator is any host device including: wearable processing devices, devices integrated into a vehicle, appliances that are part of the Internet-of-Things (IoTs), tablets, desktops, laptops, and servers.

In an embodiment, the OS kernel-level driver integrator is the upper-level filter 122 and the virtual HID digitizer 123.

The OS kernel-level driver integrator is processed on the device at a kernel level of execution within the device's installed OS.

In an embodiment, the OS is one of: Windows®, IOS®, Linux®, Android®, etc.

At 210, the OS kernel-level driver integrator intercepts an event being pushed up a peripheral stack within a kernel of an OS. In an embodiment, the peripheral stack is a USB stack within the OS.

According to an embodiment, at 211, the OS kernel-level driver integrator identifies the event as originating within the kernel and being pushed through the stack to a user-level of the OS. That is, the attached peripheral generates the event at the kernel level and the OS kernel-level driver integrator traps or filters the event.

In an embodiment, at 212, the OS kernel-level driver integrator processes as an upper-level filter for a HID supported by the OS for a peripheral attached to a host device. The host device executes the OS and the OS kernel-level driver integrator.

In an embodiment, the upper-level filter is the upper-level filter 122.

According to an embodiment, at 213, the OS kernel-level driver integrator attaches, through the upper-level filter, a PDO linked to a FDO for a virtualized device installed in the OS.

In an embodiment the virtualized device is the HID digitizer 123.

At 220, the OS kernel-level driver integrator translates the event to a format that the OS is configured to process.

In an embodiment of 213 and 220, at 221, the OS kernel-level driver integrator performs the translation process of 220 through the virtualized device.

In an embodiment, at 222, the OS kernel-level driver integrator maps values provided with the event to a range of second values supported by the OS.

In an embodiment of 222 and at 223, the OS kernel-level driver integrator identifies the values as X and Y coordinates associated with a HID and generated by the HID that is attached to a host device. The host device executes the OS and the OS kernel-level driver integrator.

In an embodiment of 223 and at 224, the OS kernel-level driver integrator receives the X and Y coordinates from the HID. The HID is a touchscreen peripheral and the X and Y coordinates are translated by the OS as mouse coordinates for processing within the OS.

At 230, the OS kernel-level driver integrator passes the event in the format to a kernel process within the OS for continued processing within the OS. In an embodiment, the kernel process is the pass through module 124.

In an embodiment, at 240, the OS kernel-level driver integrator generates new events that are passed to the OS within the kernel in a format that the OS expects from a HID attached to a host device. The host device executes the OS and the OS kernel-level driver integrator.

According to an embodiment, at 241, the OS kernel-level driver integrator produces and passes the new events at a rate expected by the OS for the HID.

In an embodiment, at 250, the OS kernel-level driver integrator processes as a one-time installed mouse event upper-level filter and a virtualized HID driver within the peripheral stack of the host device. The host device executes the OS and the OS kernel-level driver integrator. In an embodiment, the upper-level filter is the upper-level filter 122, and the virtualized HID driver is the HID digitizer 123.

Figure 3:
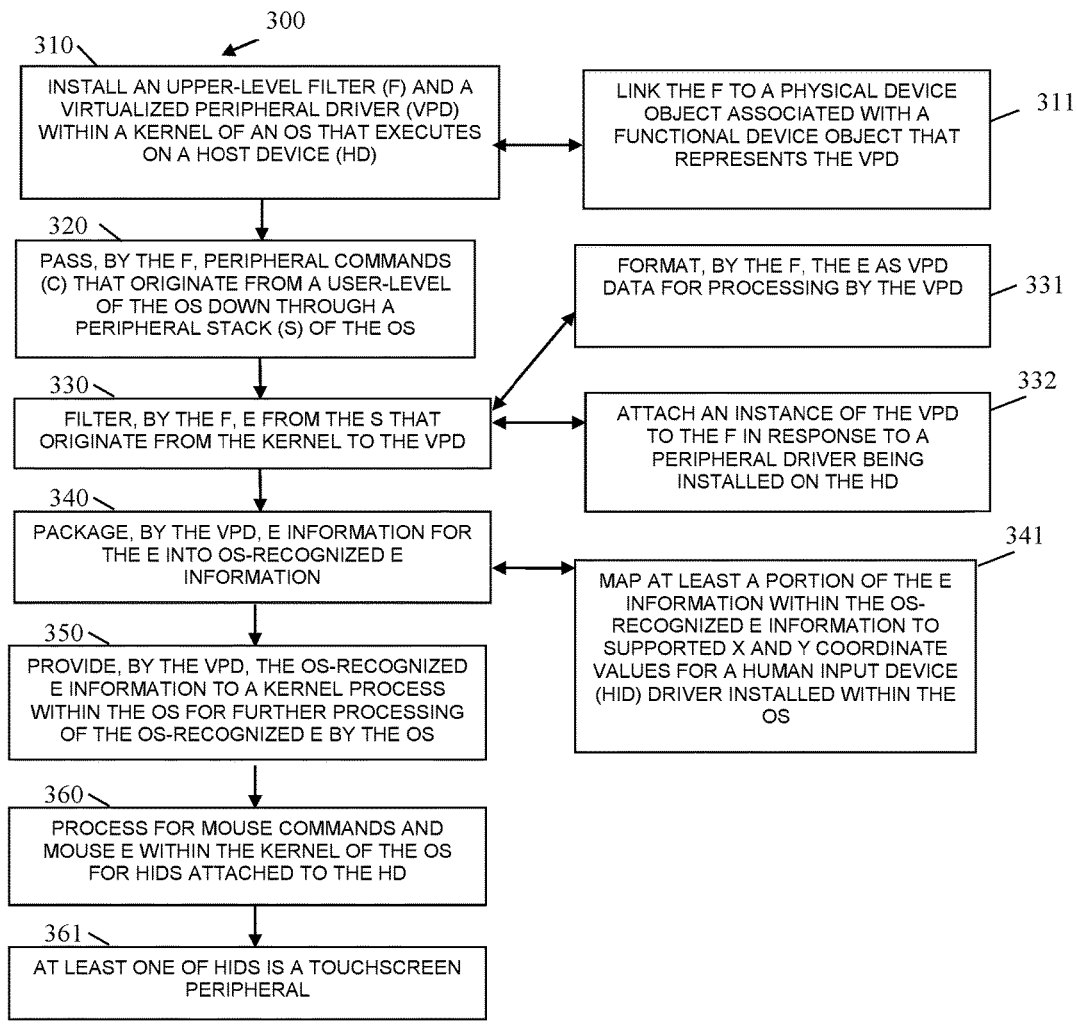
FIG. 3 is a diagram of another method for transparent device driver integration, according to an example embodiment.

FIG. 3 is a diagram of another method 300 for transparent device driver integration, according to an example embodiment. The software module(s) that implements the method 300 is referred to as a "driver integrator." The driver integrator is implemented as executable instructions programmed and residing within memory and/or a non-transitory computer-readable (processor-readable) storage medium and executed by one or more processors of a device. The processors that execute the driver integrator are specifically configured and programmed to process the driver integrator. The driver integrator has access to one or more network connections during its processing. The network connections can be wired, wireless, or a combination of wired and wireless. In an embodiment, the driver integrator does not require or does not have any network connection or access to a network during processing.

In an embodiment, the device that executes the driver integrator is the host device 120.

In an embodiment, the device that executes the driver integrator is a POS terminal.

In an embodiment, the device that executes the driver integrator is an SST. In an embodiment, the SST is an ATM. In an embodiment, the SST is a kiosk.

In an embodiment, the device that executes the driver integrator is any host device including: wearable processing devices, devices integrated into a vehicle, appliances that are part of the Internet-of-Things (IoTs), tablets, desktops, laptops, and servers.

In an embodiment, the driver integrator is all or some combination of the processing discussed above for: the upper-level filter 122, the virtualized HID digitizer 123, and/or the method 200.

In an embodiment, the OS of the device that processes the driver integrator is one of: Windows®, IOS®, Android®, Linux®, etc.

The driver integrator provides another and in some manners enhanced processing perspective from that which was described above with the FIGS. 1A, 1B, and 2.

At 310, the driver integrator installs an upper-level filter and a virtualized peripheral driver within a kernel of an OS that executes on a host device (the host device executes the driver integrator within the kernel of the OS).

In an embodiment, at 311, the driver integrator links the filter to a PDO associated with a FDO that represents the virtualized peripheral driver.

At 320, the driver integrator passes through the upper-level filter commands that originate from a user-level of the OS down through a peripheral stack of the OS. In an embodiment, the peripheral stack is a USB stack.

At 330, the driver integrator filters through the upper-level filter events from the peripheral stack that originate from the kernel and provides the events to the virtualized peripheral driver.

In an embodiment, at 331, the driver integrator formats the events as virtualized peripheral driver data for processing by the virtualized peripheral driver.

In an embodiment, at 332, the driver integrator formats through the upper-level filter the events as virtualized peripheral driver data for processing by the virtualized peripheral driver.

At 340, the driver integrator packages through the virtualized peripheral driver event information for the events into OS-recognized event information.

According to an embodiment, at 341, the driver integrator maps at least a portion of the event information within the OS-recognized event information to supported X and Y coordinate values for a HID driver installed within the OS.

At 350, the driver integrator provides through the virtualized peripheral driver the OS-recognized event information to a kernel process within the OS for further processing of the OS-recognized event by the OS. In an embodiment, the kernel process is the pass through 124.

According to an embodiment, at 360, the driver integrator is processed for mouse commands and mouse events within the kernel of the OS for HIDs attached to the host device.

In an embodiment of 360, at 361, at least one of the HIDs is a touchscreen peripheral.

Figure 4:
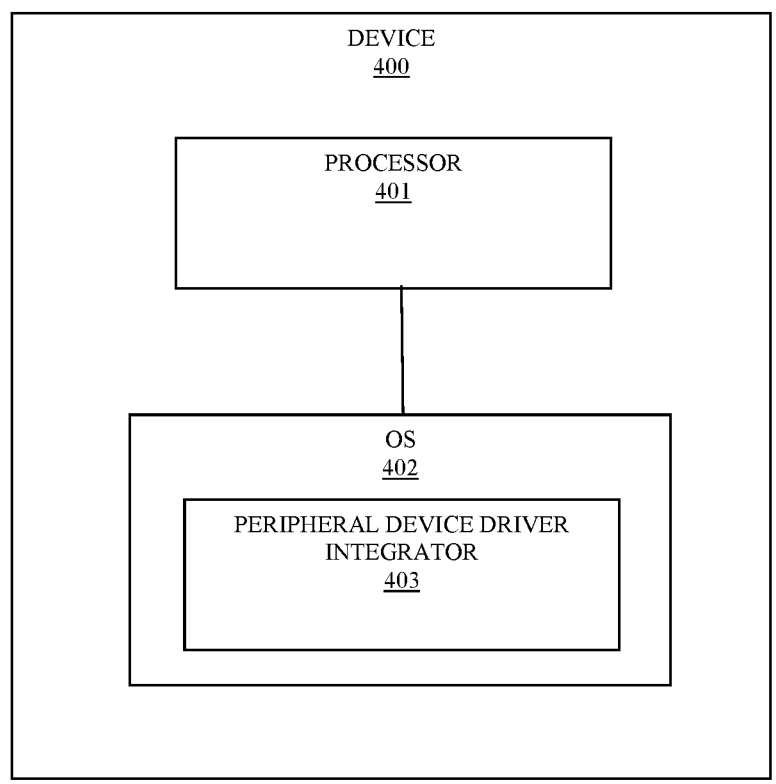
FIG. 4 is a diagram of a device for transparent device driver integration, according to an example embodiment.

FIG. 4 is a diagram of a device 400 for transparent peripheral device driver integration, according to an example embodiment. The device 400 includes a variety of hardware components and software components. The software components of the device 400 are programmed and reside within memory and/or a non-transitory computer-readable medium and execute on one or more processors of the device 400. The device 400 may communicate over one or more networks, which can be wired, wireless, or a combination of wired and wireless.

In an embodiment, the device 400 lacks any network connectivity during one mode of operation where the device where no network connectivity is present.

In an embodiment, the device 400 is the device 110.

In an embodiment, the device 400 is one of: a POS terminal, an ATM, a SST, a server, a wearable processing device, a device integrated into a vehicle, an IoT device, a tablet, a laptop, and a desktop.

In an embodiment, the device 400 is configured to all or some combination of the processing discussed above with the FIGS. 1A, 1B, and 2-3.

The device 400 includes a processor 401, and OS 402, and a peripheral device driver integrator 403.

The OS 402 is installed and executed on the processor 401 of the device.

The peripheral device driver integrator 403 is configured to pass HID commands down through a peripheral stack of the OS 402 for processing by an attached HID peripheral to the device, filter HID events generated from a kernel of the OS 402 as filtered events, iii) package the filtered events as OS-recognized events, and iv) provide the OS-recognized events to a kernel process of the OS 402 for further processing.

The peripheral device driver integrator 403 is installed and processes within the kernel of the OS 402.

In an embodiment, the peripheral device driver integrator 403 is all or some combination of the processing discussed above with the modules 122, 123, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   intercepting an event being pushed up a peripheral stack within a kernel of an Operating System (OS), wherein intercepting further includes identifying the event as originating from a peripheral driver installed within the OS;
   translating the event to a format that the OS is configured to process; and
   passing the event in the format to a kernel process within the OS for continued processing.

2. The method of claim 1, wherein intercepting further includes identifying the event as originating within the kernel and being pushed through the peripheral stack to a user-level of the OS.

3. The method of claim 1, wherein translating further includes mapping values provided with the event to a range of second values supported by the OS.

4. The method of claim 1 further comprising, generating new events that are passed to the OS within the kernel in the format that the OS expects from a Human Interface Device (HID) attached to a host device, the host device executes the OS.

5. The method of claim 1 further comprising, processing the method as a one-time installed mouse-event upper-level filter and a virtualized Human Interface Device (HID) driver within the stack of a host device that executes the OS.

6. The method of claim 2, wherein intercepting further includes processing the intercepting as an upper-level filter for a Human Interface Device (HID) supported by the OS for a peripheral attached to a host device that executes the OS.

7. The method of claim 3, wherein mapping further includes identifying the values as X and Y coordinates associated with a Human Interface Device (HID) and generated by the HID that is attached to a host device, the host device executes the OS.

8. The method of claim 4, wherein generating further includes producing and passing the new events at a rate expected by the OS for the HID.

9. The method of claim 6, wherein processing further includes attaching, by the upper-level filter, to a Physical Device Object (PDO) linked to a Functional Device Object (FDO) for a virtualized device installed in the OS.

10. The method of claim 7, wherein identifying further includes receiving the X and Y coordinates from the HID, wherein the HID is a touchscreen peripheral and the X and Y coordinates are translated by the OS into mouse coordinates for processing with the OS.

11. The method of claim 9, wherein translating further includes performing the translating by the virtualized device.

12. A method, comprising:
    installing an upper-level filter and a virtualized peripheral driver within a kernel of an Operating System (OS) that executes on a host device;
    passing, by the upper-level filter, peripheral commands that originate from a user-level of the OS down through a peripheral stack of the OS;
    filtering, by the upper-level filter, events from the peripheral stack that originate from the kernel to the virtualized peripheral driver, wherein filtering further includes detecting the events as originating from a peripheral device driver;
    packaging, by the virtualized peripheral driver, event information for the events into OS-recognized event information; and
    providing, by the virtualized peripheral driver, the OS-recognized event information to a kernel process within the OS for further processing of the OS-recognized events by the OS.

13. The method of claim 12, wherein installing further includes linking the upper-level filter to a Physical Device Object associated with a Functional Device Object that represents the virtualized peripheral driver.

14. The method of claim 12, wherein filtering further includes formatting, by the upper-level filter, the events as virtualized peripheral driver data for processing by the virtualized peripheral driver.

15. The method of claim 12, wherein filtering further includes attaching an instance of the virtualized peripheral driver to the upper-level filter in response to the peripheral driver being installed on the host device.

16. The method of claim 12, wherein packaging further includes mapping at least a portion of the event information within the OS-recognized event information to supported X and Y coordinate values for a Human Input Device (HID) driver installed within the OS.

17. The method of claim 12 further comprising, processing the method for mouse commands and mouse events within the kernel of the OS for Human Interface Devices (HIDs) attached to the host device.

18. The method of claim 17, wherein at least one of HIDs is a touchscreen peripheral.

19. A device, comprising:
    a processor;
    an Operating System (OS) installed on the device; and
    a peripheral device driver integrator;
    wherein the peripheral device driver integrator is configured to:
    i) pass Human Interface device (HID) commands down through a peripheral stack of the OS for processing by an attached HID peripheral to the device, ii) filter HID events generated from a kernel of the OS as filtered events that originate from a peripheral device driver installed for the HID peripheral, iii) package the filtered events as OS-recognized events, and iv) provide the OS-recognized events to a kernel process of the OS for further processing.

20. The device of claim 19, wherein the device is one of: a Point-Of-Sale (POS) terminal, a Self-Service Terminal (SST), and an Automated Teller Machine (ATM).

* * * * *